Aug. 26, 1924.
A. N. OTIS
1,506,443
TEMPERATURE REGULATOR
Filed Feb. 25, 1922
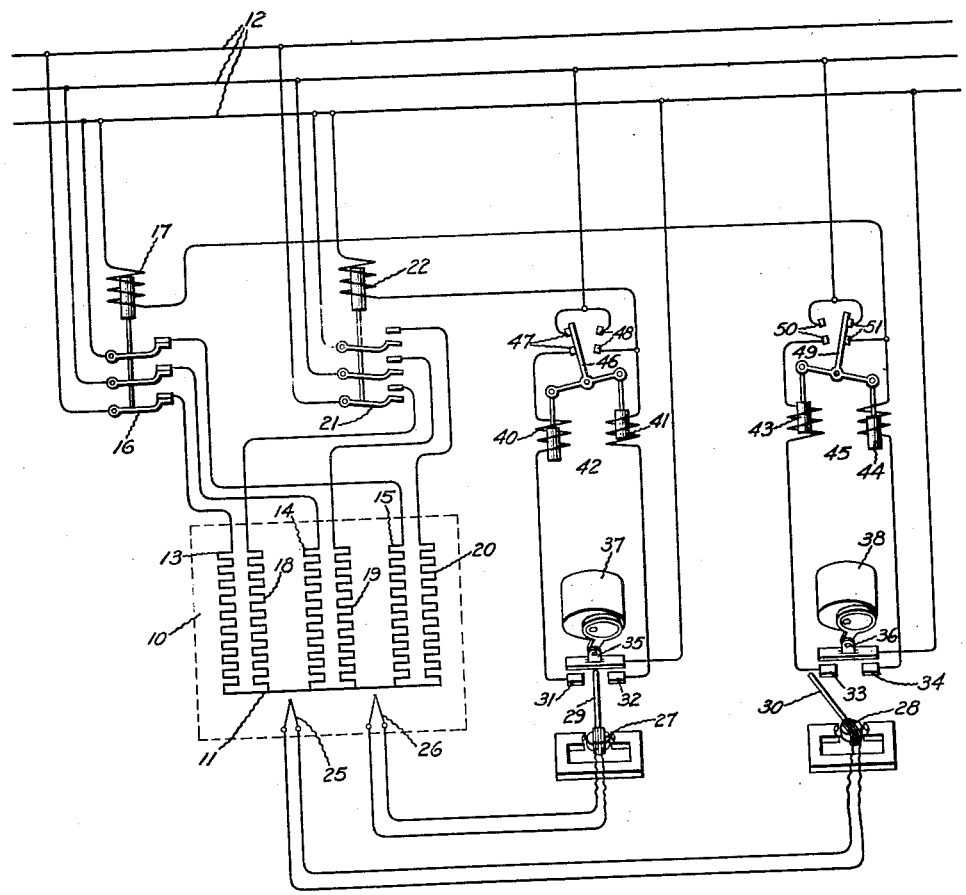
Inventor:
Albert N. Otis,
by Albert H. Davis
His Attorney.

Patented Aug. 26, 1924.

1,506,443

UNITED STATES PATENT OFFICE.

ALBERT N. OTIS, OF SCHENECTADY, NEW YORK, ASSIGNOR TO GENERAL ELECTRIC COMPANY, A CORPORATION OF NEW YORK.

TEMPERATURE REGULATOR.

Application filed February 25, 1922. Serial No. 539,270.

*To all whom it may concern:*

Be it known that I, ALBERT N. OTIS, a citizen of the United States, residing at Schenectady, county of Schenectady, State of New York, have invented certain new and useful Improvements in Temperature Regulators, of which the following is a specification.

My invention relates to temperature regulators for heated apparatus of various kinds, such as electric furnaces, and has for its object the provision of an improved method and means of this character whereby an excessive drop below the working temperature may be prevented when the apparatus is put into use after having remained idle for a brief period.

While my invention may be employed generally in connection with electrically heated apparatus, it is particularly useful in connection with the heating of apparatus requiring a relatively large amount of heat input when it is in use and only a relatively small amount of heat input to maintain the predetermined mean working temperature when it is idle, and in which a large amount of heat would be required to restore the temperature should it drop below normal. Among such apparatus may be mentioned tin pots in tin plate mills, furnaces for heating ingots, etc. In the operation of heating apparatus of this character an excessive drop in temperature occurs when the apparatus is allowed to remain idle for a brief period of time and a new charge or workpiece then introduced. This often results in delay due to the necessity of first heating the apparatus to the desired working temperature.

I have found that these disadvantages can be overcome by maintaining the apparatus when idle at a temperature somewhat higher than the working temperature whereby an appreciable amount of heat is stored and made immediately available when the apparatus is again put into operation. This method is particularly adapted to a tin or galvanizing pot where a large amount of molten material is available for use as a heat reservoir.

In carrying out my invention in one form, I divide the heating means into two sections which are independently controlled so as to tend to maintain different mean temperatures. By means of this arrangement, one of the sections is controlled to maintain a predetermined mean temperature when the apparatus is in use and the other controlled to maintain a somewhat higher mean temperature when the apparatus is temporarily idle.

For a more complete understanding of my invention, reference should be had to the accompanying drawing in the single figure of which is shown in diagrammatic form electrically heated apparatus embodying my invention.

Referring to the drawing, the heated apparatus 10, which may be a furnace, tin pot, or the like, is provided in one form of my invention with a resistance heater 11 divided into two sections energized from a suitable source of three-phase electrical supply 12. One section comprising three resistance elements 13, 14 and 15 is connected to the supply source 12 through a switch 16 actuated by an operating coil 17, while the other section comprising three resistance elements 18, 19 and 20 is connected to the source of electrical supply through a switch 21 actuated by an operating coil 22.

The energization of coils 17 and 22 is controlled by pyrometers 25 and 26 respectively so as to control the energization of the sections of the resistance heater and thereby regulate the temperature of the heated apparatus. The pyrometers are arranged to control the energization of coils 17 and 22 through control apparatus of a well known type disclosed in U. S. Patent No. 1,391,996 to Edgar F. Collins, dated September 27, 1921. They are shown in the form of thermal couples having their terminals connected respectively to galvanometers 27 and 28, the pointers 29 and 30 of which move in front of or across pairs of stationary contacts 31, 32 and 33, 34 but without touching them. These stationary contacts are adjustable, each pair being adjustable along the scale of its cooperating pointer, and the contacts of each pair being adjustable with relation to each other.

Operating in conjunction with the pointers 29 and 30 respectively are reciprocating contacts 35 and 36, which are each adapted to move in close proximity to but without touching the adjacent pair of stationary contacts and pinch momentarily the respective pointer when it stands in front of one of its stationary contacts. The reciprocating contacts are actuated slowly by any suitable means, such as by constant speed electric motors 37 and 38, the contacts being operatively connected to eccentric driving members on the motor shafts, as shown in the drawing. When pointer 29 is pinched by reciprocating contact 35, a circuit is closed between the reciprocating contact and the particular stationary contact for one or the other of the operating coils 40 and 41 of a relay switch 42 so as to control the energization of operating coil 22. In like manner, when pointer 30 is pinched by reciprocating contact 36, a circuit is closed from the reciprocating contact to the particular stationary contact through one or the other of operating coils 43 and 44 of a relay switch 45 so as to control the energization of operating coil 17.

The relay switches 42 and 45 are of the type adapted to stand in one circuit closing position or the other. Switch 42 has a contact arm 46 adapted to bridge one or the other of pairs of contacts 47 and 48, as the case may be, while switch 45 has a contact arm 49 adapted to bridge one or the other of pairs of contacts 50 and 51, as the case may be.

As thus constructed and arranged the operation of my invention is as follows: Stationary contacts 31 and 32 will be adjusted along the path of pointer 29 so that the pointer will stand opposite the gap between them at some predetermined mean working temperature, such as 580 degrees F., and they will be adjusted with relation to each other so that the pointer will be in front of one or the other of them upon a decrease or increase in temperature, for example, of two degrees. In a similar manner contacts 33 and 34 will be adjusted along the path of pointer 30 so that the pointer will stand opposite the gap between them upon the occurrence of a certain predetermined higher mean temperature, such as 590 degrees F., and in front of one or the other of them upon a decrease or increase in temperature, for example, of two degrees.

Assuming now that the heated apparatus 10 is operating at the predetermined mean working temperature of 580 degrees, then the position of the various parts will be substantially as shown in the drawing. Contact arm 49 in the position shown bridges contacts 51 maintaining the circuit for operating coil 17 closed whereby switch 16 is held in closed position and connects the resistances 13, 14 and 15 to the source of electrical supply 12. Relay switch 42, however, bridges contacts 47 whereby operating coil 22 is deenergized, and hence the section of the resistance controlled by switch 21 disconnected from the supply source. Pointer 29 stands opposite the gap between contacts 31 and 32, while pointer 30 has moved to the left of its stationary contacts 33 and 34. With the pointers in these positions the contacts 35 and 36 will be reciprocated without affecting the control circuit.

Assuming now that the temperature decreases two degrees below the mean working temperature, pointer 29 will then stand in front of contact 31 and as reciprocating contact 35 approaches will be pinched momentarily between the two contacts so as to close the control circuit for operating coil 40. Operating coil 40 thereupon throws relay switch 42 to the reverse position, opening its own circuit through contacts 47 and closing a circuit for operating coil 22 through contacts 48. Operating coil 22 thereupon closes switch 21, thus connecting the section of the heater comprising resistances 18, 19, 20 to the supply source 12. The temperature of the heated apparatus 10 will now rise, and upon an increase of two degrees above the predetermined working temperature, pointer 29 will be moved in front of contact 32 whereupon a circuit is established by reciprocating contact 35 for operating coil 41, which throws relay 42 back into the position shown in the drawing, breaking its own circuit and also the circuit for operating coil 22. Switch 21 thereupon drops out disconnecting resistances 18, 19 and 20. As the temperature of the heated apparatus again decreases, this section of the heating resistance will be again connected and subsequently disconnected upon a rise of temperature, as previously described, so as to maintain the predetermined mean working temperature. In this manner, under ordinary working conditions, one section of the resistance is continuously connected to the source of supply. This section, however, does not furnish quite enough heat to maintain the desired working temperature and the deficiency is supplied by connecting and disconnecting the other section. It will be observed that by means of this arrangement a much more uniform temperature can be maintained, when the apparatus is operating under normal conditions, than by the usual method of connecting and disconnecting the total amount of heating resistance.

In case now the charge is removed from the heated apparatus or the heated apparatus otherwise allowed to remain idle for a brief period with the electrical supply source connected, switch 21 will be opened, as previously described, upon an increase in temperature of two degrees above the mean working temperature. Switch 16 will remain closed, however, and the temperature of the heated apparatus will consequently continue to rise to 592° F. or two degrees above the higher mean temperature for which contacts 33 and 34 are set. When this temperature is reached pointer 30 stands in front of contact 34 and will be pinched by reciprocating contact 36. A circuit will thus be closed for operating coil 44, which throws switch 45 to its reverse position breaking its own circuit and also the circuit for operating coil 17. Switch 16 thereupon drops out disconnecting the remaining section of the heating resistance. The heated apparatus now cools until the temperature falls to two degrees below the predetermined higher mean value of 590° F. when pointer 30 will stand in front of contact 33 and will be pinched by contact 36 so as to close the circuit for operating coil 43, which throws relay switch 45 back to the position shown in the drawing, breaking its own circuit and closing the circuit for operating coil 17. Coil 17 thereupon closes switch 16 again connecting this section of the resistance to supply source 12. A predetermined higher mean temperature is thus maintained when the heated apparatus is idle whereby an appreciable amount of heat is stored in the apparatus.

When the heated apparatus is again put into operation, the stored heat is immediately available to heat the work or the charge, and as the temperature slightly decreases from the higher mean value switch 16 will be closed, as previously described, to connect resistances 13, 14, and 15 which will also supply heat to the apparatus, tending to prevent a further drop in temperature. The temperature of the heated apparatus will, however, drop slowly to the lower mean working temperature as the work or charge absorbs heat, since this section of the heater is not sufficient to maintain the working temperature. Switch 21 will be closed as the temperature decreases below the mean working temperature, whereby the remaining section of resistance will be connected to the supply source, and the temperature thereafter maintained at the desired mean working temperature, as previously described. By means of my invention I thus prevent excessive drops in temperature below the mean working temperature.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. In a temperature regulator, the combination with a heated device, heating means therefor, and temperature responsive means for controlling said heating means so as to maintain said device at different mean temperatures depending on the conditions of operation.

2. In a temperature regulator for electric furnaces, the combination with an electric heater therefor, of means responsive to the temperature of said furnace for controlling said heater so as to maintain a predetermined mean temperature when a charge is being heated, and a higher mean temperature when the furnace is operating without a charge.

3. In a temperature regulator for electrically heated apparatus, the combination with an electric heater therefor divided into a plurality of sections, of means responsive to the temperature of said apparatus for separately controlling said sections so as to maintain a predetermined mean temperature when the apparatus is in use and a different predetermined mean temperature under other conditions.

4. In a temperature regulator for electrically heated apparatus, the combination with an electric heater therefor divided into a plurality of sections, of a source of electrical supply for said heater, and temperature responsive control means for each of said sections for connecting and disconnecting said sections with said supply source so as to maintain said apparatus at different mean temperatures depending on the conditions of operation.

5. In a temperature regulator for electrically heated apparatus, the combination with an electric heater therefor divided into two sections, a source of electrical supply for said heater, relays for independently controlling the connection of the sections to said supply source, and temperature responsive means for controlling said relays so as to maintain said apparatus at different mean temperatures depending on the conditions of operation.

6. In a temperature regulator for electrically heated apparatus, the combination with an electric heater therefor divided into two sections, temperature responsive control means for one of said sections adapted to maintain a predetermined mean working temperature when the apparatus is in use, and temperature responsive control means for said other section adapted to maintain a higher mean temperature when said apparatus is temporarily idle.

7. In a temperature regulator for electrically heated apparatus, the combination with an electric heater therefor divided into two sections, a source of electrical supply for said heater, and temperature responsive devices for controlling the connection of said sections to said supply source separately so as to tend to maintain different mean temperatures, whereby one of said sections is controlled to maintain a predetermined mean working temperature when the apparatus is in use, and said other section controlled to maintain a higher mean temperature when the apparatus is temporarily idle.

8. In a temperature regulator for electric furnaces, the combination with an electric heater therefor divided into a plurality of sections, of a source of electrical supply for said heater, and means responsive to the temperature of said furnace for connecting and disconnecting one of said sections to maintain a predetermined mean temperature when a charge is being heated, and for connecting and disconnecting another of said sections to maintain a higher mean temperature when the furnace is operating without a charge.

9. The method of regulating the temperature of heated apparatus which consists in maintaining said apparatus at a predetermined mean temperature when in use and at a predetermined higher mean temperature under other conditions.

10. The method of regulating the temperature of electrically heated apparatus which consists in controlling a portion of the heating element to maintain a predetermined mean temperature when the apparatus is in use, and controlling another portion of said heating element to maintain a predetermined higher mean temperature when the apparatus is idle.

In witness whereof, I have hereunto set my hand this 24th day of February, 1922.

ALBERT N. OTIS.